Inventors
Fred P. Baertschi
Floyd R. Nelson

Patented Jan. 23, 1951

2,538,752

UNITED STATES PATENT OFFICE 2,538,752

OVERHEAD TRAVELING CARRIER

Fred P. Baertschi, South Beloit, and Floyd R. Nelson, Rockford, Ill.; said Nelson assignor to said Baertschi Application July 7, 1949, Serial No. 103,392

13 Claims. (Cl. 212—131)

This invention relates generally to overhead traveling carriers, but is more particularly concerned with improvements in the small or medium sized carriers of the kind disclosed in the copending application of Fred P. Baertschi, Serial No. 624,308, filed October 24, 1945 and now Patent No. 2,475,584 granted July 12, 1949.

The principal object of our present invention is to provide a stronger and more compact, and generally improved, design of carrier, better adapted for universal use industrially and otherwise than that disclosed in the copending application, although still utilizing most, if not all, of the advantageous features of that earlier design.

The invention is illustrated in the accompanying drawings, in which—

Figure 1:
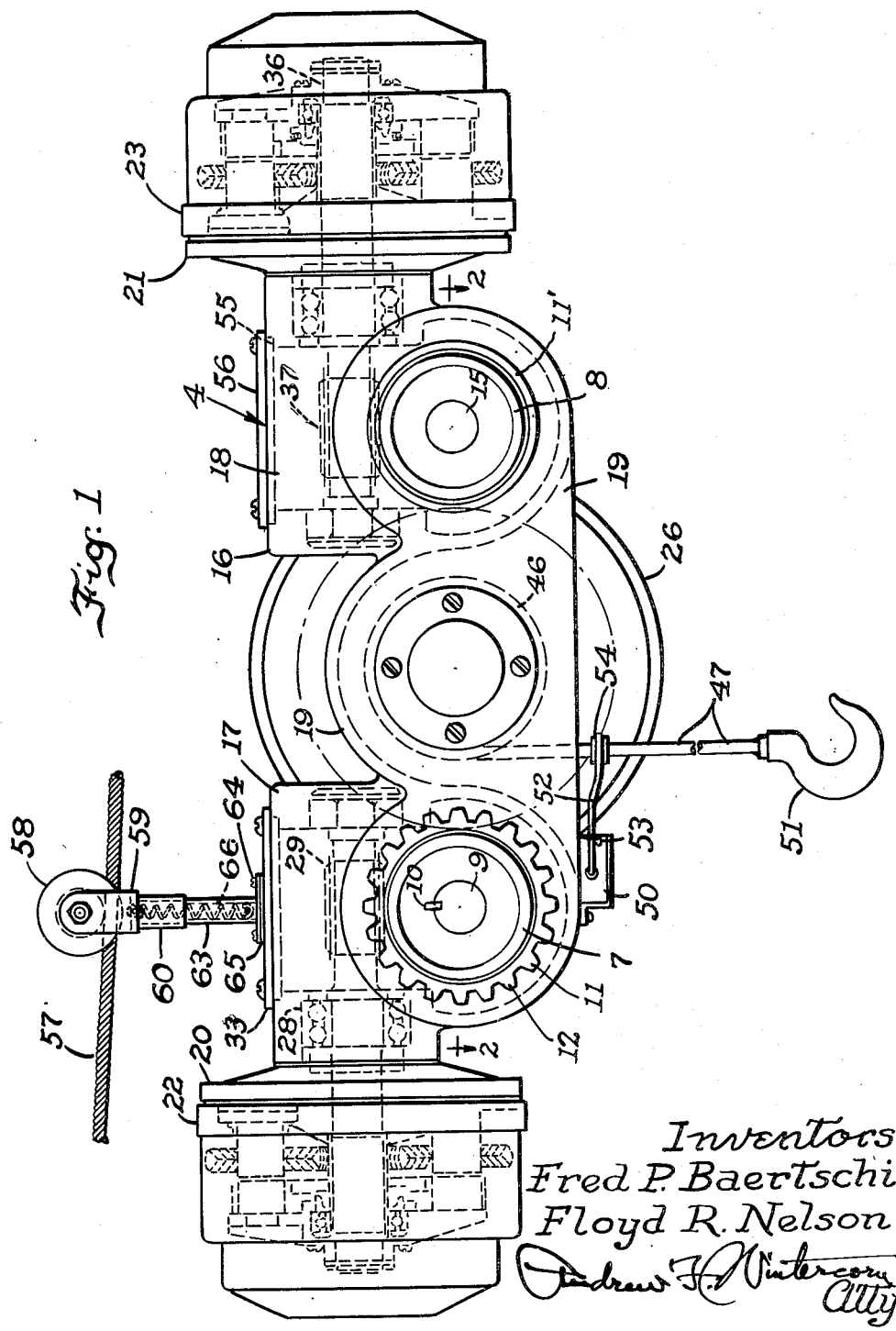
Figure 2:
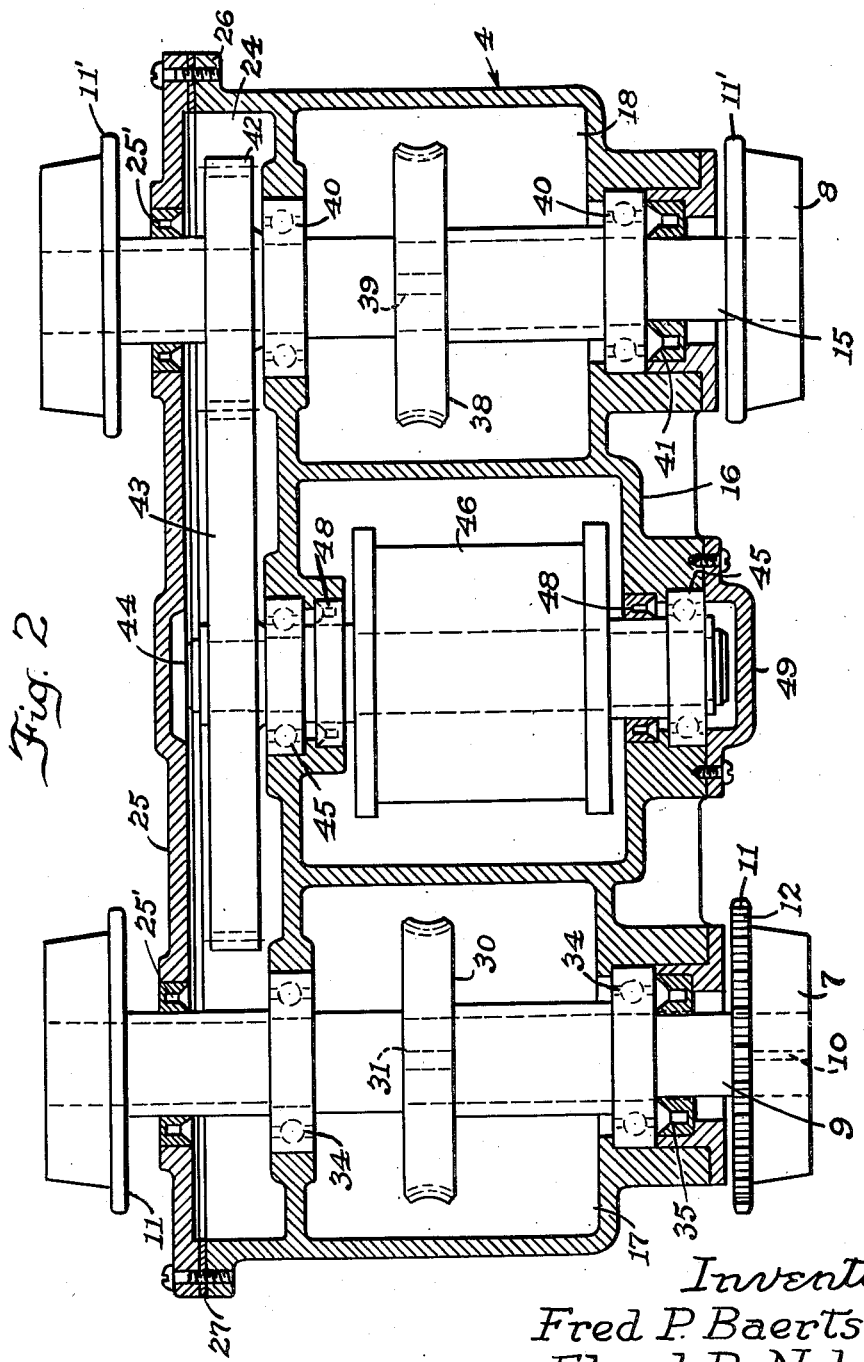
Figure 3:
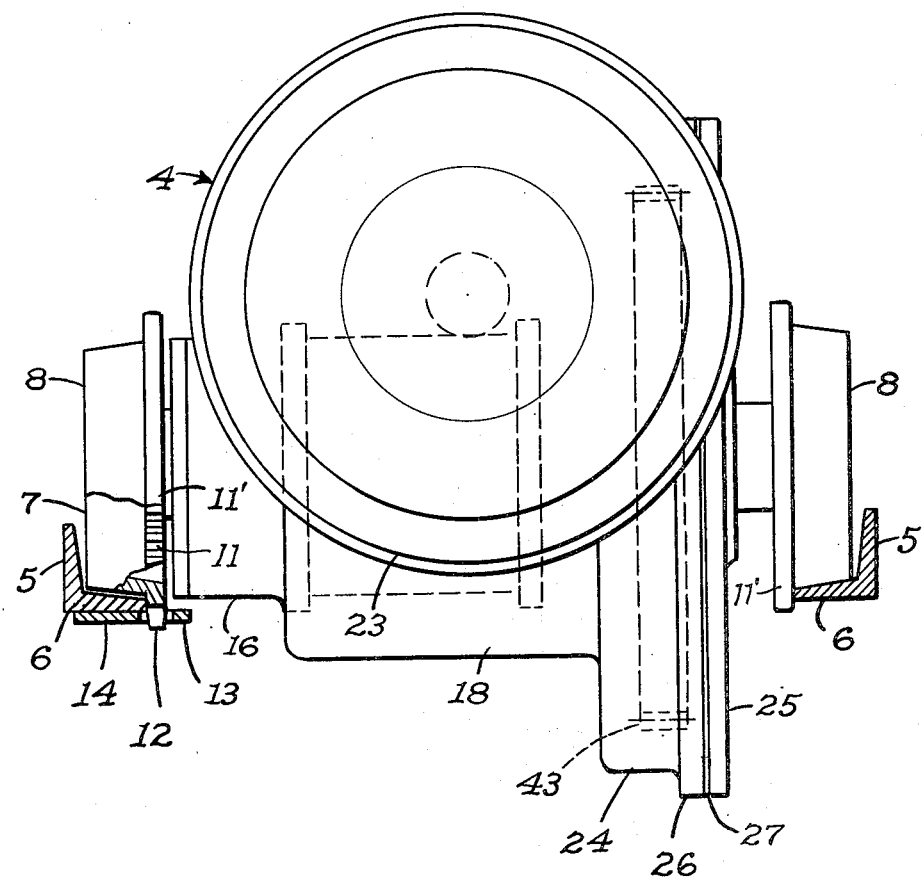

Fig. 1 is a side view of the carrier of our invention on a reduced scale, slightly less than half-size;

Fig. 2 is a horizontal section on line 2—2 of Fig. 1, on a slightly larger scale, approximately half-size, and Fig. 3 is an end view, on the same scale as Fig. 2, showing the suspension tracks in cross-section, with the lower portion of the left rear wheel broken away, so as to enable showing the novel relationship of the toothed flange on the front gear-wheel of the flange of the track and the rack thereon.

The same reference numerals are applied to corresponding parts in these views.

The carriage, indicated generally by the reference numeral 4, runs on a pair of spaced parallel tracks 5, which are suitably suspended from the roof or ceiling of the shop or other space in which the carrier of our invention is installed. Although spaced angle irons are shown at 5, similarly as in the copending application, it will be manifest that spaced I-beams or channels could be used, if desired, when greater strength and rigidity is needed, inwardly directed flanges 6 being available in either case, upon which the two pairs of railcar type wheels 7 and 8, provided on opposite ends of the carriage, may run. The one pair of wheels 7 are fixed to the ends of their axle or cross-shaft 9 as by keys 10, and the flanges 11 on these wheels ride along the inner edges of the flanges 6, and the flange on one of these wheels has gear teeth 12 on its periphery running in a punched sheet metal rack 13, that is suitably welded by its one longitudinal edge portion 14 to the bottom of the flange 6, whereby positively to drive the carriage 4 in one direction or the other, depending on the direction of drive transmitted to the axle 9. The other pair of wheels 8 also have flanges 11' of smaller radius than the flanges 11, to run along the inner edges of the flanges 6 but without contacting the rack 13 on the one flange 6. These wheels 8 turn freely on their axle or cross-shaft 15.

The carriage 4 comprises a main casting 16 providing closed gear housings 17 and 18 in its opposite end portions adapted to contain oil baths for the ample lubrication of the gears and axles therein, and an open bottom drum housing 19 in the middle portion between and connecting the two gear housings. In addition, the casting 16 provides on its opposite ends in concentric relation to one another radially enlarged mounting flange portions 20 and 21, onto which are bolted axial air gap electric motors 22 and 23. A recess 24 is provided in one side of the casting 16 to define a gear chamber extending lengthwise thereof adapted to contain other gearing and afford intercommunication between the housings 17 and 18, so that a predetermined level of oil bath may be maintained in the two housings and the gearing in the recess 24 may at the same time be properly lubricated. A cover plate 25 is suitably bolted to the flange 26 on the casting 16 to close the recess 24, and a gasket 27 is provided between these parts to seal the joint. Suitable retainers are provided at 25' to prevent loss of lubricant.

The motor 22, which is reversible, has an armature shaft received in a bearing 28, said shaft extending into the housing 17 and carrying a worm 29 on its inner end, meshing with a worm gear 30 that is suitably keyed or splined to the axle 9, as indicated at 31, whereby to transmit drive in either direction to the wheels 7 and, accordingly, cause the carriage 4 to travel in one direction or the other. The top wall of the housing 17 has an opening large enough to permit inserting the worm gear 30 therethrough in the assembling of the gear on the axle 9. A closure plate 33 seals this opening, and, as will soon appear, provides the support for the trolleys. The axle 9 runs in anti-friction bearings 34, and a lubricant retainer 35 is provided around only the one end of the axle outside the adjacent bearing 34, because the bearing 34 for the other end of the axle is between the recess 24 and housing 17 and it is through that bearing that the lubricant flows from the recess 24 into the housing 17, or vice versa. It is manifest that with this construction the bearings and the gearing are both assured of ample lubrication at all times.

The other motor 23, which is also reversible, has an armature shaft 36 extending into the housing 18 and carrying a worm 37, which meshes with a worm gear 38 that is keyed or splined on the axle 15, as indicated at 39. The axle 15 runs in anti-friction bearings 40, and, here again, only a single retainer 41 is provided for the one end of the axle outside one of these bearings, because the other bearing at the other end of the axle affords communication therethrough between recess 24 and housing 18 for flow of lubricant into and out of the housing 18. A spur gear 42 is keyed, or otherwise suitably secured, on the axle 15 in recess 24, and meshes with another and appreciably larger spur gear 43 that is suitably fixed on one end of the drum shaft 44. This shaft runs in anti-friction bearings 45 and carries the drum 46 thereon, on which the hoisting cable, indicated at 47 in Fig. 1, is wound. Retainers 48 are provided inwardly in relation to bearings 45 on opposite sides of the drum 46, the one retainer 48 preventing loss of lubricant from the recess 24, the bearing at that end of the shaft 44 being lubricated directly from the recess 24. The bearing at the other end of the shaft is separately packed with lubricant, and a removable cover plate 49 is provided to enclose this bearing. It is evident from this description that the drum 46 can be driven in either direction by motor 23 through the two-stage reduction illustrated, and ample lubrication is assured for all of the bearings and gearing. In passing, attention is called to the limit switch 50, shown in Fig. 1, which is connected in circuit with the motor 23, to break the circuit automatically when the load carrying hook 51 reaches a predetermined level in the hoisting of a load. The switch 50 has an oscillating arm 52, which normally rests on a stop 53 but which is arranged to be raised when the elongated loop 54 on the free end of the arm 52 and having the cable 47 extending therethrough is raised by the shank of the hook 51. Here again, an opening 55 is provided in the top wall of the housing 18 large enough to permit passing the worm gear 38 therethrough in assembling this gear on the axle 15. A cover plate 56 closes the opening and, like the cover plate 33, may be used for support of some of the trolleys.

The motors 22 and 23 are supplied with current from trolley wires 57, which are suitably suspended above the supporting track structure 5—6. Running on the top of each of these wires is a trolley wheel 58 of the conventional flanged type mounted in a fork 59 carried on the upper end of a square tubular standard 60 that is adapted to carry a terminal, to which is attached a conductor forming a part of the motor circuit. Each standard 60 slides freely on a square tubular post 63, the base 64 of which is suitably secured on the cover plate 33 but insulated therefrom, as indicated at 65. A tension spring 66, enclosed in the post 63 and anchored at its lower end in said post, is connected at its upper end to the fork 59, so as to exert a downward pull on the trolley wheel 58, to insure a good contact at all times.

In operation, each of the motors 22 and 23 is controlled separately by manual operation of forward and reverse buttons provided on a control panel that may be fixed on the wall, or portable, as preferred. It requires no special skill to operate this carrier, because it is only necessary to depress one button for forward travel of the carriage 4 and another for return travel; likewise for up and down movement of the cable 47 by means of drum 46. If the operator carelessly keeps the button depressed when the carriage reaches the end of the track, an overload circuit breaker (not shown) opens the circuit so that no harm will be done to motor 22. The same is true in regard to overloading of the hoist motor 23. The compact design of the present carriage 4 is evident from the drawings and enables closer spacing of the supporting tracks 5 and, consequently, simplifies the problem of affording adequate strength and rigidity in the supporting structure. Although the inverted U-shaped hangers on which the tracks 5 are carried are not shown, it will be understood the same arrangement for supporting the tracks will be used as disclosed in the copending application. Ample strength in the carriage itself is assured with the one-piece elongated casting 16 providing the open-bottom drum housing 19 between the opposed end gear housings 17 and 18. The bearings for both cross-shafts or axles 9 and 15, and the gearing connected therewith, are always assured of ample lubrication for quiet operation and minimum wear.

It is believed the foregoing description conveys a good understanding of the objects and advantages of our invention. The appended claims have been drawn to cover all legitimate modifications and adaptations.

We claim:

1. In a travelling carrier, an overhead track formed by a pair of closely laterally spaced parallel members having horizontal flanges thereon projecting inwardly toward each other, a carriage disposed between said track flanges having railcar type flanged wheels mounted on opposite sides thereof running on said track flanges so that the wheel flanges are arranged to abut the outer edges of said track flanges to guide the carriage, at least one of said track flanges having a rack carried on the bottom thereof and projecting inwardly therefrom, at least one of said wheels having gear teeth on the peripheral portion of its flange meshing with said rack, a remotely controllable reversible electric motor on said carriage associated with drive means connected to at least the last named wheel to drive the same selectively in either direction, a hoist drum rotatably mounted on said carriage having a cable wound thereon for suspending a load attaching member, and a remotely controllable reversible electric motor on said carriage associated with drive means connected to said drum to drive the same selectively in either direction.

2. In a portable carrier, the combination of an elongated frame member providing closed gear housings in opposite ends and an open bottom drum housing in the middle portion, a hoist drum rotatably mounted crosswise in said middle housing, cross shafts mounted in parallel relation to one another in the end housings and projecting laterally from opposite sides thereof, one of said shafts having a step-down gearing connection with said drum, reversible electric motors mounted on the outer end walls of the end housings and having shafts extending inwardly therefrom at right angles to said cross-shafts and each drivingly connected with the adjacent cross-shaft by means of a worm on the motor shaft meshing with a worm gear on the cross-shaft, and wheels carried on the projecting outer ends of said cross-shafts, at least one of the wheels on the cross-shaft that is independent of the hoisting drum being fixed to said shaft for propulsion of the carriage in either direction.

3. A portable carrier as set forth in claim 2 including an overhead track structure formed by a pair of closely laterally spaced parallel members having horizontal flanges thereon projecting inwardly toward each other, said wheels running on said track flanges and having annularly projecting flanges arranged to abut the outer edges of said track flanges to guide the frame member of said carrier, at least one of said track flanges having a rack carried on the bottom thereof and projecting inwardly therefrom, at least the propulsion wheel having gear teeth on the periphery of its annular flange meshing with said rack.

4. A portable carrier as set forth in claim 2 wherein said frame member has a passage provided therein establishing intercommunication between said end housings so that fluid lubricant can flow from one to the other, whereby to maintain lubricant at a common level slightly below the plane of the cross-shafts in said housings.

5. A portable carrier as set forth in claim 2 wherein said frame member is formed to provide a chamber extending lengthwise thereof on one side through which one end portion of both cross-shafts extend, bearings for said cross-shafts in the frame member, said chamber establishing communication through said bearings between said end housings so that fluid lubricant can flow from one to the other in said chamber to maintain lubricant at a common level slightly below the plane of the cross-shafts in said housing.

6. A portable carrier as set forth in claim 2 wherein said frame member is formed to provide a chamber extending lengthwise thereof on one side through which one end portion of both cross-shafts extend, bearings for said cross-shafts in the frame member, said chamber establishing communication through said bearings between said end housings so that fluid lubricant can flow from one to the other in said chamber to maintain lubricant at a common level slightly below the plane of the cross-shafts in said housing, the step-down gearing connection being disposed also in said chamber and arranged to be lubricated by the lubricant therein.

7. A portable carrier as set forth in claim 2 wherein said end housings have openings in the top walls thereof to admit the worm gears in the assembling of the carrier, the carrier including cover plates for closing said openings.

8. A portable carrier as set forth in claim 2 wherein said end housings have openings in the top walls thereof to admit the worm gears in the assembling of the carrier, the carrier including cover plates for closing said openings, and wherein said carrier is associated with overhead conductor means for supplying current to said motors, said carrier having contact means carried on at least one of said cover plates and engaging said conductor means.

9. In a portable carrier, an elongated substantially horizontal frame casting formed to provide closed gear housings in opposite ends and an open bottom drum housing in the middle portion, the end housings having motor mounting pad portions in substantially vertical planes on their outer end walls in substantially concentric relation, reversible electric motors mounted detachably on said pad portions having shafts extending substantially horizontally into said end housings, cross-shafts mounted in said end housings in transverse relation to said motor shafts and projecting from opposite sides of said frame casting, driving connections between said motor shafts and said cross-shafts, wheels on the ends of said cross-shafts, a hoist drum rotatably mounted in the drum housing, and a driving connection between one of said cross-shafts and said drum.

10. A portable carrier as set forth in claim 9 including an overhead track structure formed by a pair of closely laterally spaced parallel members having horizontal flanges thereon projecting inwardly toward each other, said wheels running on said track flanges and having annularly projecting flanges arranged to abut the outer edges of said track flanges to guide the frame casting of said carrier, at least one of said track flanges having a rack carried on the bottom thereof and projecting inwardly therefrom.

11. A portable carrier as set forth in claim 9 wherein said frame casting has a passage provided therein establishing intercommunication between said end housings so that fluid lubricant can flow from one to the other, whereby to maintain lubricant at a common level slightly below the plane of the cross-shafts in said housings.

12. A portable carrier as set forth in claim 9 wherein said frame casting is formed to provide a chamber extending lengthwise thereof on one side through which one end portion of both cross-shafts extend, bearings for said cross-shafts in the frame casting, said chamber establishing communication through said bearings between said end housings so that fluid lubricant can flow from one to the other in said chamber to maintain lubricant at a common level slightly below the plane of the cross-shafts in said housing.

13. In an overhead travelling carrier comprising a supporting track structure, and a carriage having wheels running on said track structure for supporting and guiding said carriage, the carriage including a hoist drum, a reversible electric motor drivingly connected with said drum, and a reversible electric motor drivingly connected with at least one of said wheels, overhead trolley wires suspended over said track structure for supplying electric current from a source to said motors, trolley wheels running on top of said wires, and supports for said trolley wheels mounted on said carriage in insulated relationship thereto and having spring means associated therewith for yieldingly urging said wheels downwardly into close contact with said wires, said supports adapted to have electrical conductors connected therewith for connection in the electrical circuits of said motors.

FRED P. BAERTSCHI.
FLOYD R. NELSON.

No references cited.